(12) United States Patent
Nakahara

(10) Patent No.: US 10,187,157 B2
(45) Date of Patent: Jan. 22, 2019

(54) OPTICAL TRANSMITTER MODULE

(71) Applicant: Oclaro Japan, Inc., Sagamihara, Kanagawa (JP)

(72) Inventor: Kouji Nakahara, Tokyo (JP)

(73) Assignee: Oclaro Japan, Inc., Kanagawa (JP)

( * ) Notice: Subject to any disclaimer, the term of this patent is extended or adjusted under 35 U.S.C. 154(b) by 10 days.

(21) Appl. No.: 15/443,016

(22) Filed: Feb. 27, 2017

(65) Prior Publication Data

US 2017/0257170 A1    Sep. 7, 2017

(30) Foreign Application Priority Data

Mar. 2, 2016    (JP) .................................. 2016-039862

(51) Int. Cl.
| | |
|---|---|
| *H04B 10/50* | (2013.01) |
| *H04J 14/04* | (2006.01) |
| *H04B 10/54* | (2013.01) |
| *G02B 6/293* | (2006.01) |
| *G02F 1/01* | (2006.01) |
| *G02B 6/125* | (2006.01) |
| *G02B 6/28* | (2006.01) |
| *G02B 6/12* | (2006.01) |

(52) U.S. Cl.
CPC ......... *H04B 10/5053* (2013.01); *G02B 6/125* (2013.01); *G02B 6/2938* (2013.01); *G02B 6/29344* (2013.01); *G02F 1/011* (2013.01); *H04B 10/541* (2013.01); *H04J 14/04* (2013.01); *G02B 6/2813* (2013.01); *G02B 2006/12142* (2013.01)

(58) Field of Classification Search
CPC .......................... H04B 10/5053; H04B 10/54; G02B 6/29344; G02B 6/2938; G02F 1/011; H04J 14/04
See application file for complete search history.

(56) References Cited

U.S. PATENT DOCUMENTS

| | | | | |
|---|---|---|---|---|
| 5,109,441 | A * | 4/1992 | Glaab | G02F 1/225 385/1 |
| 5,864,414 | A * | 1/1999 | Barnsley | H04J 14/0227 398/3 |

(Continued)

FOREIGN PATENT DOCUMENTS

| | | |
|---|---|---|
| JP | 2001-159748 A | 6/2001 |
| JP | 2015-207803 A | 11/2015 |

*Primary Examiner* — Mina Shalaby
(74) *Attorney, Agent, or Firm* — Mattingly & Malur, PC

(57) ABSTRACT

To provide an optical transmitter module with simplified control of a voltage to be applied to an optical modulator. An optical transmitter module includes a semiconductor laser for irradiating a laser beam; a demultiplexer for branching the laser beam to output branched light beams; optical modulators for modulating an optical amplitude of each of the branched light beams into a first optical amplitude or a second optical amplitude, depending on an input level at two levels; and a multiplexer for multiplexing output light beams from the optical modulators. The optical transmitter module may include optical waveguides for connecting the optical modulators and the multiplexer, and the optical waveguides may include a first optical waveguide for causing a first phase difference and a second optical waveguide for causing a second phase difference different from the first phase difference.

3 Claims, 12 Drawing Sheets

(56) References Cited

U.S. PATENT DOCUMENTS

| | | | | |
|---|---|---|---|---|
| 2003/0123122 A1* | 7/2003 | Nakamura | G02F 1/0327 | 359/248 |
| 2009/0169148 A1* | 7/2009 | Doerr | G02F 1/2257 | 385/3 |
| 2009/0252501 A1* | 10/2009 | Eiselt | H04B 10/5053 | 398/185 |
| 2010/0060972 A1* | 3/2010 | Kucharski | G02F 1/225 | 359/290 |
| 2010/0260505 A1* | 10/2010 | Dahan | H04B 10/505 | 398/183 |
| 2011/0069975 A1* | 3/2011 | Liu | H04B 10/61 | 398/202 |
| 2011/0158577 A1* | 6/2011 | Doerr | G02F 1/2257 | 385/3 |
| 2011/0176815 A1* | 7/2011 | Frankel | H04B 10/5053 | 398/184 |
| 2011/0305255 A1* | 12/2011 | Ishimura | B82Y 20/00 | 372/50.1 |
| 2013/0121706 A1* | 5/2013 | Yang | H04B 10/506 | 398/187 |
| 2014/0036937 A1* | 2/2014 | Doerr | H04B 10/40 | 370/535 |
| 2014/0133868 A1* | 5/2014 | Krause | H04B 10/5051 | 398/184 |
| 2014/0133870 A1* | 5/2014 | Lee | H04B 10/5053 | 398/186 |
| 2014/0328601 A1* | 11/2014 | Cavaliere | H04B 10/5053 | 398/188 |
| 2015/0104192 A1* | 4/2015 | Huang | H04B 10/541 | 398/186 |
| 2016/0119057 A1* | 4/2016 | Mekis | H04J 14/02 | 398/51 |
| 2016/0139485 A1* | 5/2016 | Winzer | G02F 1/2255 | 385/3 |
| 2017/0257170 A1* | 9/2017 | Nakahara | H04B 10/5053 | |

* cited by examiner

FIG.3

| INPUT SIGNAL | | CONTROL SIGNAL TO OPTICAL MODULATOR | | | PHASE RELATIONSHIP (DIFFERENCE FROM SECOND WAVEGUIDE) | |
|---|---|---|---|---|---|---|
| A | B | FIRST MODULATOR | SECOND MODULATOR | THIRD MODULATOR | FIRST WAVEGUIDE | THIRD WAVEGUIDE |
| 0 | 0 | 0 | 0 | 0 | 72° | 92° |
| 0 | 1 | 0 | 1 | 0 | 25° | 44° |
| 1 | 0 | 1 | 1 | 0 | 71° | 44° |
| 1 | 1 | 1 | 1 | 1 | 71° | 91° |

OPTICAL TRANSMITTER MODULE

CROSS-REFERENCE TO RELATED APPLICATION

The present application claims priority from Japanese application JP 2016-039862, filed on Mar. 2, 2016, the content of which is hereby incorporated by reference into this application.

BACKGROUND OF THE INVENTION

1. Field of the Invention

The present invention relates to an optical transmitter module.

2. Description of the Related Art

As a modulation method for an optical signal for use in optical communication, there has been known a pulse amplitude modulation (PAM) for encoding a signal, utilizing a difference in optical amplitude. The PAM is roughly classified into direct modulation for modulating optical amplitude of a semiconductor laser and external modulation for modulating a laser beam from a semiconductor laser, using an optical modulator. As an optical modulator for external modulation, an electro-absorption optical modulator (hereinafter referred to as an EA modulator) may be used.

JP 2015-207803 A discloses a digital/analog converter circuit for converting a digital input of two bits or greater into an analog output at four or greater levels.

JP 2001-159748 A discloses a semiconductor optical function device having optical modulators connected in series or in parallel.

SUMMARY OF THE INVENTION

In recent years, in order to ensure a larger amount of communication data, multi-level PAM greater than binary PAM has been studied. For example, in order to obtain a quaternary PAM signal by externally modulating a laser beam outputted from a semiconductor laser by an EA modulator, a voltage at four levels is inputted to the EA modulator.

However, there is a case in which a relationship between an applied voltage and an output optical amplitude of an optical modulator such as an EA modulator, etc., is not necessarily linear. Therefore, in order to obtain a desired output optical amplitude, a circuit capable of precise control of a voltage to be applied to an optical modulator is necessary, which may increase the cost of an optical transmitter module.

In view of the above, an object of the present invention is to provide an optical transmitter module adapted to simple control of a voltage to be applied to an optical transmitter module.

(1) In order to achieve the above described object, an optical transmitter module according to the present invention includes a semiconductor laser for irradiating a laser beam; a demultiplexer for branching the laser beam to output a plurality of branched light beams; a plurality of optical modulators for modulating an optical amplitude of each of the plurality of branched light beams into a first optical amplitude or a second optical amplitude stronger than the first optical amplitude, depending on an input level at two levels; and a multiplexer for multiplexing output light beams from the plurality of optical modulators.

(2) The optical transmitter module according to the above described (1) may further include a plurality of optical waveguides for connecting the plurality of optical modulators and the multiplexer, wherein the plurality of optical waveguides may include a first optical waveguide for causing a first phase difference between an input port thereof and an output port thereof, and a second optical waveguide for causing a second phase difference from the first phase difference between an input port thereof and an output port thereof.

(3) In the optical transmitter module according to the above described (1), the demultiplexer may be a multimode interferometer.

(4) In the optical transmitter module according to the above described (1), the multiplexer is a multimode interferometer.

(5) In the optical transmitter module according to the above described (3), the demultiplexer may be formed using a first multimode interferometer for branching the laser beam to output an N number (N being an integer equal to or greater than three) of branched light beams, and a second multimode interferometer for multiplexing the M number (M being an integer equal to or greater than two, wherein M<N) of branched light beams among the N number of branched light beams.

(6) In the optical transmitter module according to the above described (5), the multiplexer may be formed using a third multimode interferometer for multiplexing the N−M+1 number of output light beams into a single light beam.

(7) In the optical transmitter module according to the above described (3), the demultiplexer may be formed using a fourth multimode interferometer for branching the laser beam to output the K number (K being an integer equal to or greater than three) of branched light beams.

(8) In the optical transmitter module according to the above described (7), the multiplexer may be formed using a fifth multimode interferometer for multiplexing the K number of branched light beams into a single light beam.

According to the present invention, there is provided an optical transmitter module with simplified control of a voltage to be applied to an optical modulator.

BRIEF DESCRIPTION OF THE DRAWINGS

FIG. 3 is a table showing an input signal, a control signal to an optical modulator, and a phase relationship among optical waveguides;

DETAILED DESCRIPTION OF THE INVENTION

Figure 12:
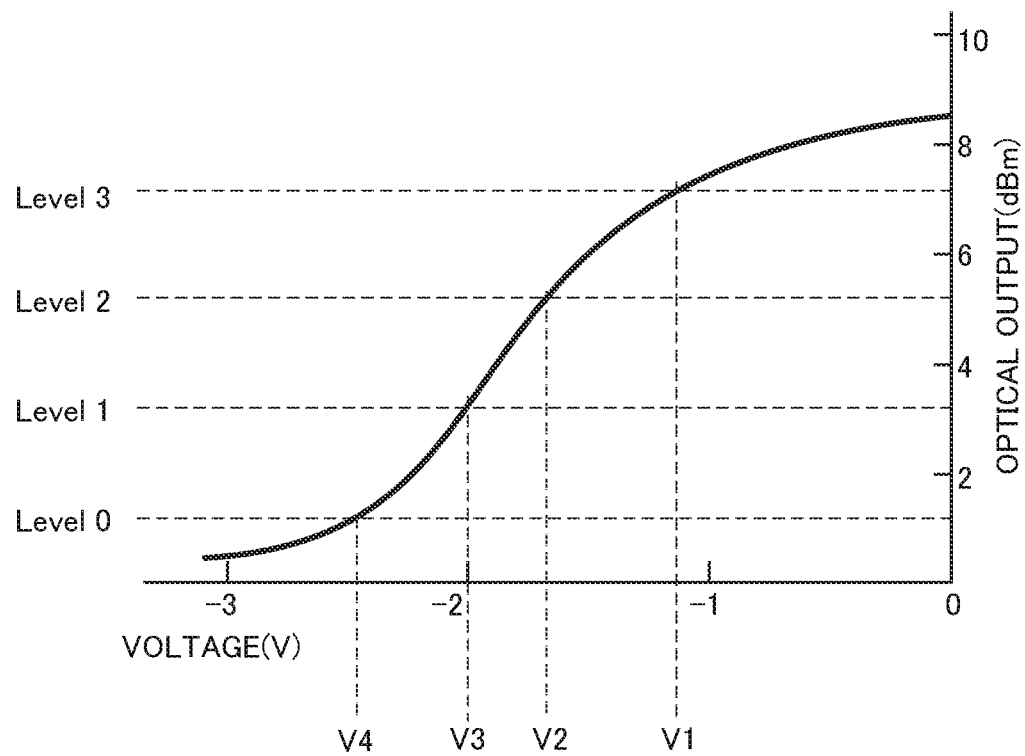
FIG. 12 shows a relationship between an applied voltage and an optical output in an EA modulator.

FIG. 12 shows a relationship between an applied voltage and an optical output in an EA modulator. In the EA modulator, generally, the amount of light absorbed varies non-linearly relative to a voltage applied, and an extinction ratio (a ratio in optical amplitude between a light beam inputted and a light beam outputted) varies non-linearly relative to the applied voltage. In this drawing, a relationship between an applied voltage and an optical output when an EA modulator modulates an optical amplitude to obtain a PAM 4 signal (a quaternary PAM signal) is shown. As shown in this drawing, it is necessary to set an applied voltage so as to be a voltage V4, V3, V2, or V1 in order to obtain an optical output at four levels, namely, levels 0, 1, 2, and 3, at equal intervals. In the above, three voltage intervals, namely, (V1-V2), (V2-V3), and (V3-V4), are different from one another.

Note here that assuming that the relationship between an applied voltage and an optical output of an EA modulator is linear, a voltage interval may be set equal in order to obtain an optical output at four levels at equal intervals, and a two-bit signal may be sufficient for a control signal to be inputted to an EA modulator in order to produce a PAM 4 signal. However, as the relationship between an applied voltage and an optical output of an EA modulator is non-linear, in order to obtain an optical output at levels at equal intervals, it is necessary to adjust applied voltages such that the intervals for the applied voltages are unequal and a signal of eight or sixteen bits or greater may be necessary as a control signal to be inputted into an EA modulator. Additionally, when an EA modulator is operated at a high speed, such as about 25 Gbit/s, an expensive digital signal processor and a digital/analog converter adapted to high speed operation are required in order to generate a control signal to be inputted into the EA modulator, which results in a high cost for an optical transmitter module. Moreover, naturally, precise control of an applied voltage is necessary to ensure equal intervals for the levels of an optical output in order to obtain a multi-level PAM signal greater than a quaternary PAM signal.

In view of the above, the inventor of the present invention has earnestly studied about an optical transmitter module including an EA modulator, and succeeded in simplifying control of a voltage to be applied to an optical modulator. In the following, embodiments of the present invention will be described in detail.

[First Embodiment]

Below, embodiments of the present invention will be specifically described in detail, based on the attached drawings. Note that members having identical function are given the same reference numerals in all drawings referred to in description of the embodiments, and described only once. Also note that the attached drawings are to be referred to only to describe a mere example of an embodiment, and the respective sizes shown are not necessarily coincident with the scale mentioned in the description of the present invention.

Figure 1:
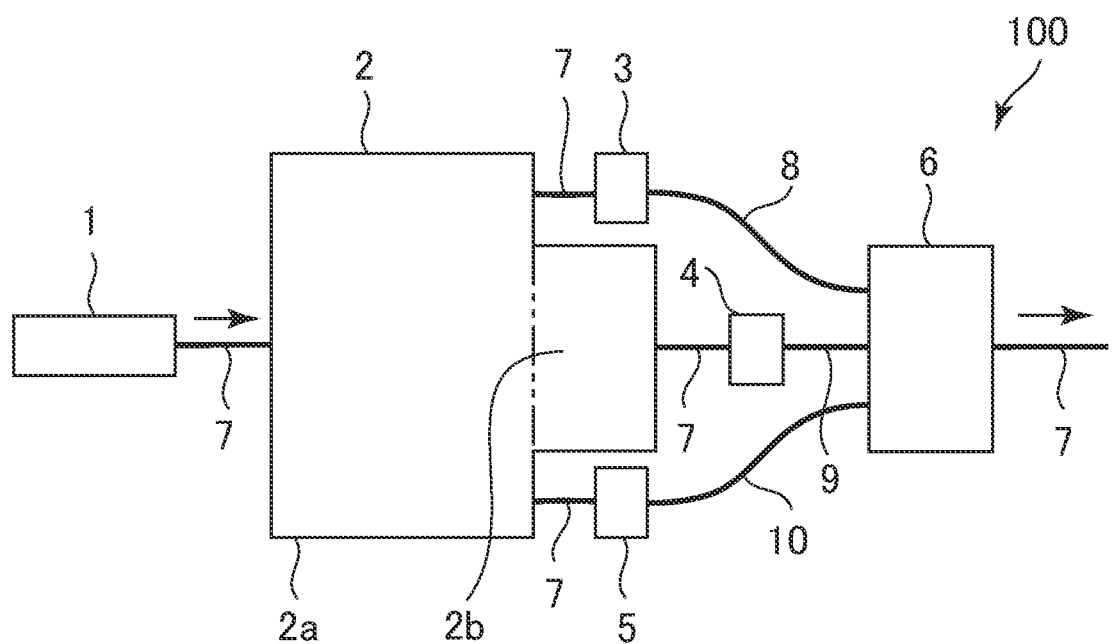
FIG. 1 shows a structure of an optical transmitter module according to a first embodiment of the present invention.

FIG. 1 shows a structure of an optical transmitter module 100 according to a first embodiment of the present invention. The optical transmitter module 100 according to this embodiment includes a semiconductor laser 1 for irradiating a laser beam. The semiconductor laser 1 may be a distributed feedback (DFB) laser that oscillates a light of a single wavelength in 1.3 μm band.

The optical transmitter module 100 according to this embodiment has a one-to-three demultiplexer 2 for branching a laser beam to output a plurality of branched light beams. The one-to-three demultiplexer 2 is a multimode interferometer, and branches a single laser beam outputted from the semiconductor laser 1 into three branched laser beams for three optical waveguides 7. The one-to-three demultiplexer 2 is formed including a one-to-five demultiplexer portion 2a and a three-to-one multiplexer portion 2b integrated, each being a multimode interferometer. As will be described later in detail, the one-to-five demultiplexer portion 2a branches a laser beam outputted from the semiconductor laser 1 into five branched light beams each having an optical amplitude at the substantially same level. Two out of the five branched light beams are inputted into an upper optical waveguide 7 and a lower optical waveguide 7, respectively, while the remaining three to the three-to-one multiplexer portion 2b. The three-to-one multiplexer portion 2b multiplexes the three branched light beams into one before inputting to a middle optical waveguide 7. Therefore, the ratio in optical amplitude among the light beams inputted into the upper optical waveguide 7, the middle optical waveguide 7, and the lower optical waveguide 7, respectively, is about 1:3:1.

The optical transmitter module 100 according to this embodiment includes a plurality of optical modulators for modulating the optical amplitude of a plurality of branched light beams into a first optical amplitude or a second optical amplitude stronger than the first optical amplitude, depending on an two-level input level. Specifically, the optical transmitter module 100 according to this embodiment includes a first modulator 3 connected to the upper optical waveguide 7, a second modulator 4 connected to the middle optical waveguide 7, and a third modulator 5 connected to the lower optical waveguide 7. Each of the first modulator 3, the second modulator 4, and the third modulator 5 may be an EA modulator having a similar structure, and modulates a branched light beam inputted according to a control signal. Each of the first modulator 3, the second modulator 4, and the third modulator 5 extinguishes a majority of a branched light beam inputted, using an applied voltage at about −3 V, to implement the first optical amplitude in response to a control signal 0 inputted (in the case of a control signal at an OFF level), and lets a majority of a branched light beam inputted to pass therethrough, using an applied voltage at about 0 V, to implement the second optical amplitude in response to a control signal 1 inputted (in the case of a control signal at an ON level).

The optical transmitter module 100 according to this embodiment includes a three-to-one multiplexer 6 for multiplexing the light beams outputted from the plurality of optical modulators, namely, the first modulator 3, the second modulator 4, and the third modulator 5. The three-to-one multiplexer 6 is a rectangular multimode interferometer, receives the light beams outputted from the first modulator 3, the second modulator 4, and the third modulator 5 via a first waveguide 8, a second waveguide 9, and a third waveguide 10, respectively, and multiplexes the light beams received into a single light beam before outputting to the optical waveguide 7.

The optical transmitter module 100 according to this embodiment includes a plurality of optical waveguides (the first waveguide 8, the second waveguide 9, and the third waveguide 10) that connect the plurality of optical modulators, namely, the first modulator 3, the second modulator 4, and the third modulator 5, with the three-to-one multiplexer 6. The plurality of optical waveguides include a first optical waveguide for causing a first phase difference between an input port thereof and an output port thereof and a second optical waveguide for causing a second phase difference different from the first phase difference between an input port thereof and an output port thereof. In the optical transmitter module 100 according to this embodiment, the phase difference caused between an input port and an output port of the first waveguide 8 is different from that caused between an input port and an output port of the second waveguide 9. Further, the phase difference caused between the input port and the output port of the first waveguide 8 is different from that caused between an input port and an output port of the third waveguide 10. Furthermore, the phase difference caused between the input port and the output port of the second waveguide 9 is different from that caused between the input port and the output port of the third waveguide 10. The respective phase differences may be adjusted, based on a geometric condition, such as the length or shape of the respective optical waveguides, or based on change in a refractive index, such as depletion or current injection into a semiconductor layer constituting the optical waveguide. The phase differences caused in the respective optical waveguides will be described in detail referring to FIG. 3.

Note that the structural components of the optical transmitter module 100 according to this embodiment are monolithic for accumulation on a single semiconductor substrate. Specifically, an active layer and a waveguide layer made from InGaAsP or InGaAlAs and an InP cladding layer are formed on an InP substrate to integrate the semiconductor laser 1, the one-to-three demultiplexer 2, the optical waveguide 7, the first modulator 3, the second modulator 4, the third modulator 5, the first waveguide 8, the second waveguide 9, the third waveguide 10, and the three-to-one multiplexer 6. Alternatively, the structural components of the optical transmitter module 100 may not be monolithic, but may be discrete for individual formation and subsequent combination, or hybrid for desirable combination of monolithic and discrete.

Figure 2:
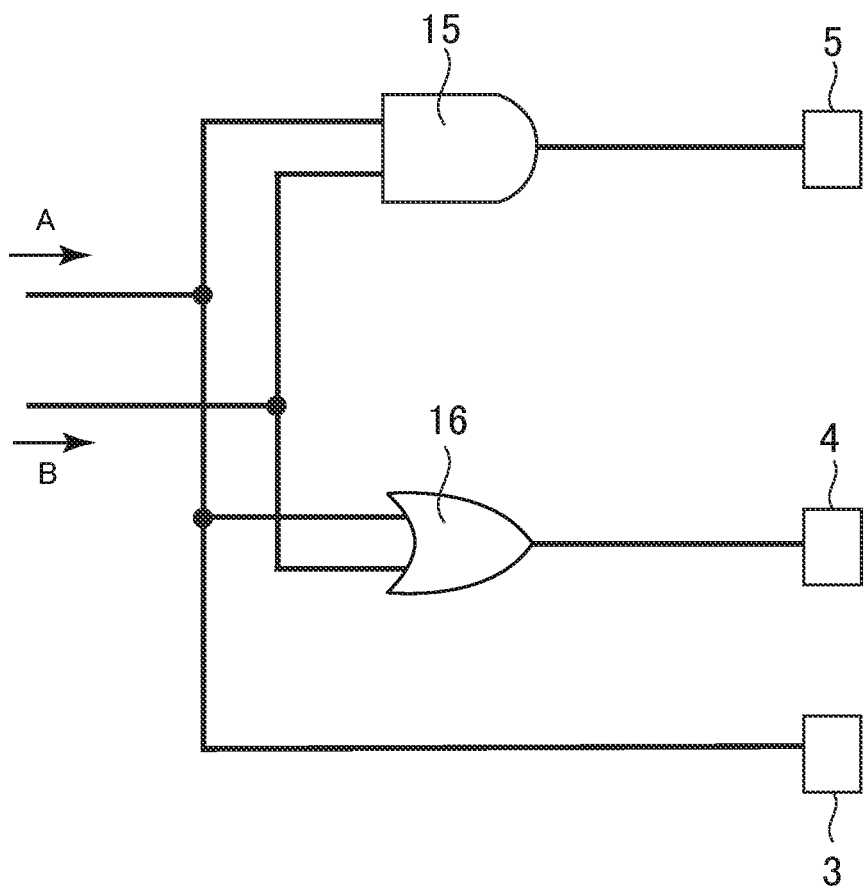
FIG. 2 is a circuit diagram showing a circuit for generating control signals to a first modulator, a second modulator, and a third modulator.

FIG. 2 is a circuit diagram showing a circuit for generating control signals to be applied to the first modulator 3, the second modulator 4, and the third modulator 5, respectively. A circuit for generating a control signal includes an AND circuit 15 and an OR circuit 16, and converts binary input signals A, B. A relationship between the input signals A, B and control signals to be outputted to the first modulator 3, the second modulator 4, and the third modulator 5, respectively, will be described in detail referring to the subsequent drawing.

FIG. 3 is a table showing an input signal, a control signal to an optical modulator, and a phase relationship among optical waveguides. When the input signal A is 0 and the input signal B is 0, control signals inputted to the first modulator 3, the second modulator 4, and the third modulator 5 are all 0. In the above, the difference between the phase difference caused between the input port and the output port of the first waveguide 8 and that caused between the input port and the output port of the second waveguide 9 is 72°. Also, the difference between the phase difference caused between the input port and the output port of the third waveguide 10 and that caused between the input port and the output port of the second waveguide 9 is 92°.

Figure 4:
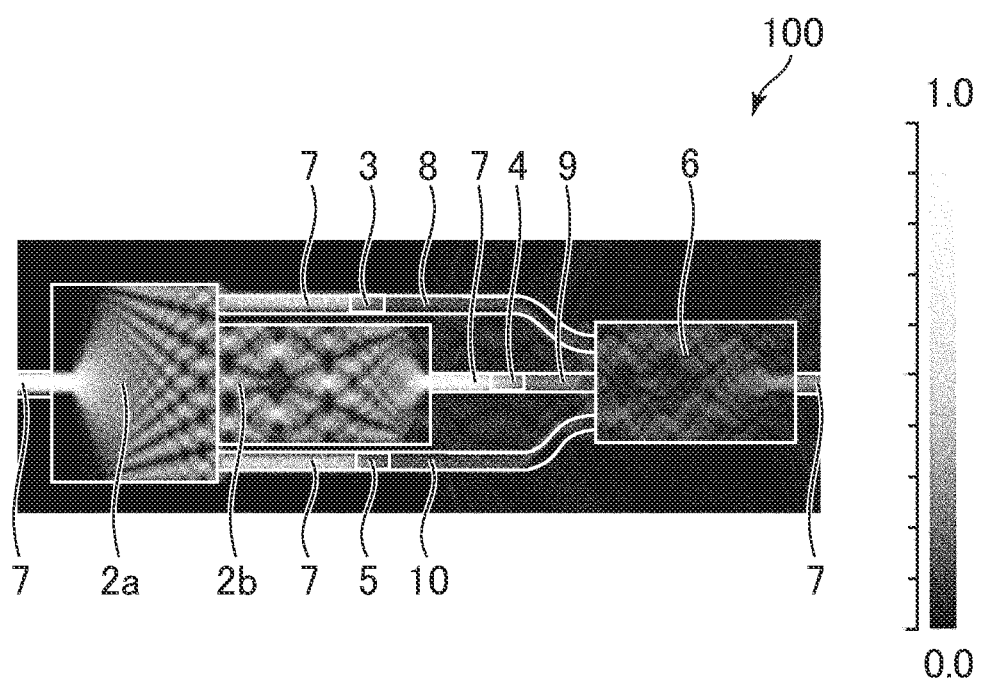
FIG. 4 shows an optical amplitude of a light beam propagated inside an optical transmitter module in the case of control signals with a first combination.

FIG. 4 shows an optical amplitude of a light beam propagated inside the optical transmitter module 100 in the case of control signals with a first combination (0, 0, 0). In this drawing, an optical amplitude distribution is expressed such that assuming that an optical amplitude of a laser beam irradiated from the semiconductor laser 1 is 1, white is expressed, and that assuming that the optical amplitude closer to 0, darker black is expressed. In this drawing, a light beam among five branched light beams branched by the one-to-five demultiplexer portion 2a, inputted into the upper optical waveguide 7 is mostly extinguished by the first modulator 3 to which a control signal at an OFF level has been inputted. Further, three light beams among the five branched light beams branched by the one-to-five demultiplexer portion 2a, inputted into the three-to-one multiplexer portion 2b are inputted into the middle optical waveguide 7 and mostly extinguished by the second modulator 4 to which a control signal at an OFF level has been inputted. Furthermore, a light beam among the five branched light beams branched by the one-to-five demultiplexer portion 2a, inputted into the lower optical waveguide 7 is mostly extinguished by the third modulator 5 to which a control signal at an OFF level has been inputted.

Each of the first modulator 3, the second modulator 4, and the third modulator 5 absorbs a majority of the branched light beam inputted thereto and lets a hint thereof to pass therethrough to output to the first waveguide 8, the second waveguide 9, and the third waveguide 10, respectively. To each of the light beams propagated inside the first waveguide 8, the second waveguide 9, and the third waveguide 10, respectively, a phase difference in accordance with the length or shape of the respective waveguide is caused. The three output light beams are inputted into the three-to-one multiplexer 6 with different phases, and multiplexed into one light beam before being outputted to the optical waveguide 7 at an end port. The optical amplitude of the light beam outputted to the optical waveguide 7 at the end port is about 8% of that of the laser beam irradiated from the semiconductor laser 1.

Returning to FIG. 3, in the case where the input signal A is 0 and the input signal B is 1, a control signal 0 (an OFF level) is inputted into the first modulator 3, a control signal 1 (an ON level) is inputted into the second modulator 4, and a control signal 0 (an OFF level) is inputted into the third modulator 5. In the above, the difference between the phase difference caused between the input port and the output port of the first waveguide 8 and that caused between the input port and the output port of the second waveguide 9 is 25°. Also, the difference between the phase difference caused between the input port and the output port of the third waveguide 10 and that caused between the input port and the output port of the second waveguide 9 is 44°.

Figure 5:
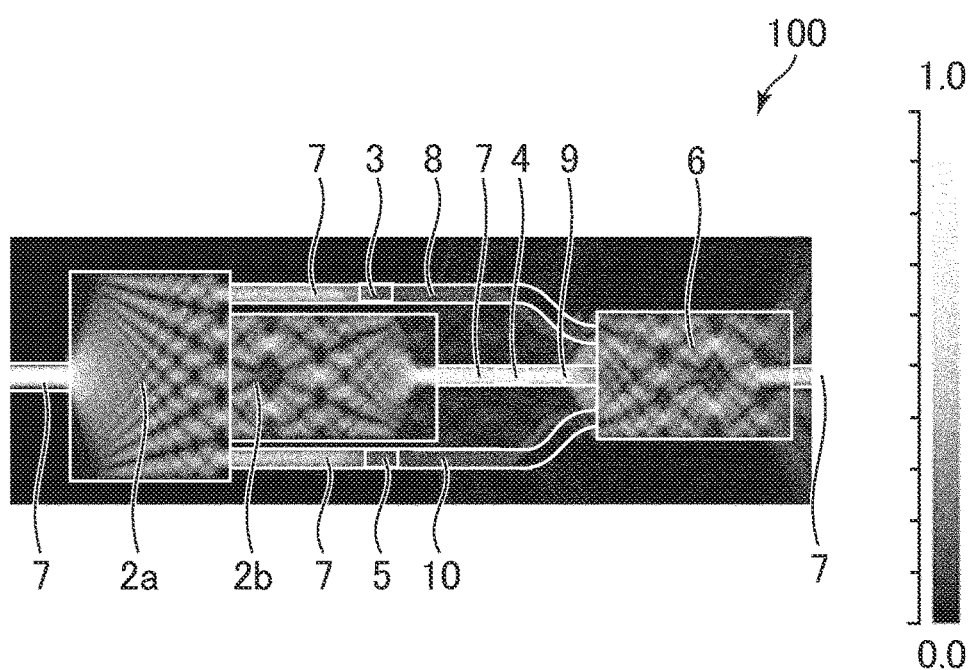
FIG. 5 shows an optical amplitude of a light beam propagated inside an optical transmitter module in the case of control signals with a second combination.

FIG. 5 shows an optical amplitude of a light beam propagated inside the optical transmitter module 100 in the case of control signals with a second combination (0, 1, 0). In this drawing, an optical amplitude distribution is expressed such that assuming that the optical amplitude of a laser beam irradiated from the semiconductor laser 1 is 1, white is expressed, and that assuming that the optical amplitude closer to 0, darker black is expressed. In this drawing, a light beam among the five branched light beams branched by the one-to-five demultiplexer portion 2a, inputted into the upper optical waveguide 7 is mostly extinguished by the first modulator 3 to which a control signal at an OFF level has been inputted. Three light beams among the five branched light beams branched by the one-to-five demultiplexer portion 2a, inputted into the three-to-one multiplexer portion 2b are inputted into the middle optical waveguide 7 and mostly let to pass through by the second modulator 4 to which a control signal at an ON level has been inputted. A light beam among the five branched light beams branched by the one-to-five demultiplexer portion 2a, inputted into the lower optical waveguide 7 is mostly extinguished by the third modulator 5 to which a control signal at an OFF level has been inputted.

The first modulator 3 and the third modulator 5 absorb a majority of the branched light beam inputted thereinto and let a hint thereof to pass therethrough to output to the first waveguide 8 and the third waveguide 10, respectively. Meanwhile, the second modulator 4 lets a majority of the branched light beams inputted thereinto to pass therethrough to output to the second waveguide 9. To each of the light beams propagated inside the first waveguide 8, the second waveguide 9, and the third waveguide 10, respectively, a phase difference in accordance with the length and shape of the respective waveguide is caused. The three output light beams are inputted into the three-to-one multiplexer 6 with different phases, and multiplexed into one light beam before being outputted to the optical waveguide 7 at the end port. The optical amplitude of the light beam outputted to the optical waveguide 7 at the end port is about 34% of that of the optical amplitude of the laser beam irradiated from the semiconductor laser 1.

Returning to FIG. 3, in the case where the input signal A is 1 and the input signal B is 0, a control signal 1 (an ON level) is inputted into the first modulator 3, a control signal 1 (an ON level) is inputted into the second modulator 4, and a control signal 0 (an OFF level) is inputted into the third modulator 5. In the above, the difference between the phase difference caused between the input port and the output port of the first waveguide 8 and that caused between the input port and the output port of the second waveguide 9 is 71°. Further, the difference between the phase difference caused between the input port and the output port of the third waveguide 10 and that caused between the input port and the output port of the second waveguide 9 is 44°.

Figure 6:
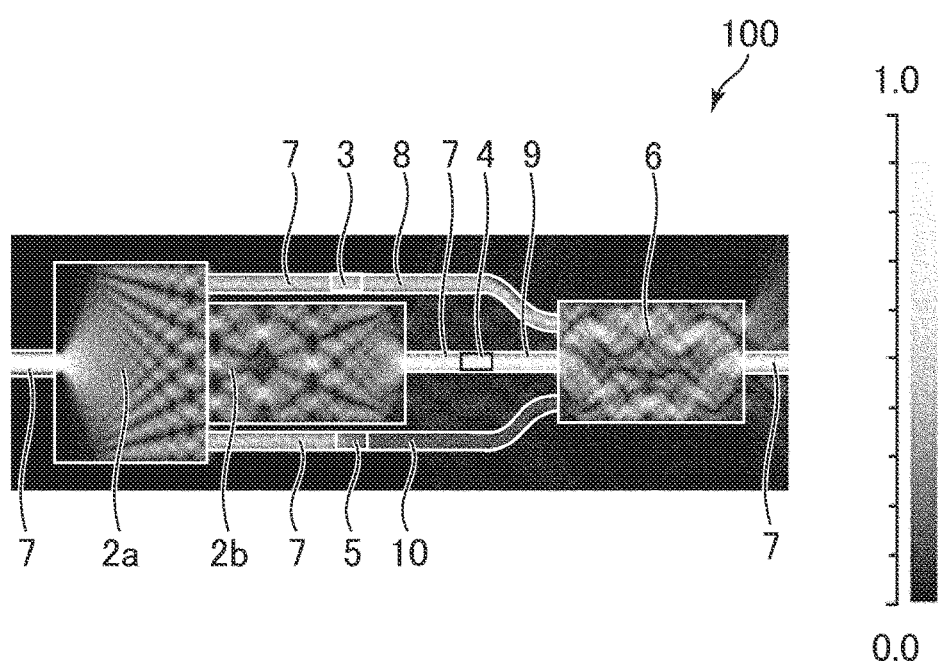
FIG. 6 shows an optical amplitude of a light beam propagated inside an optical transmitter module in the case of control signals with a third combination.

FIG. 6 shows an optical amplitude of a light beam propagated inside the optical transmitter module 100 in the case of control signals with a third combination (1, 1, 0). In this drawing, an optical amplitude distribution is expressed such that assuming that the optical amplitude of a laser beam irradiated from the semiconductor laser 1 is 1, white is expressed, and that assuming that the optical amplitude closer to 0, darker black is expressed. In this drawing, a light beam among the five branched light beams branched by the one-to-five demultiplexer portion 2a, inputted into the upper optical waveguide 7 is mostly let to pass through by the first modulator 3 to which a control signal at an ON level has been inputted. Three light beams among the five branched light beams branched by the one-to-five demultiplexer portion 2a, inputted into the three-to-one multiplexer portion 2b are inputted into the middle optical waveguide 7 and mostly let to pass through by the second modulator 4 to which a control signal at an ON level has been inputted. A light beam among the five branched light beams branched by the one-to-five demultiplexer portion 2a, inputted into the lower optical waveguide 7 is mostly extinguished by the third modulator 5 to which a control signal at an OFF level has been inputted.

The third modulator 5 absorbs a majority of the branched light beam inputted thereinto and let a hint thereof to pass therethrough to output to the third waveguide 10. Further, the first modulator 3 and the second modulator 4 let a majority of the branched light beams inputted thereinto to pass therethrough to output to the first waveguide 8 and the second waveguide 9, respectively. To each of the light beam propagated inside the first waveguide 8, the second waveguide 9, and the third waveguide 10, respectively, a phase difference in accordance with the length and shape of the respective waveguide is caused. The three output light beams are inputted into the three-to-one multiplexer 6 with different phases, and multiplexed into one light beam before being outputted to the optical waveguide 7 at the end port. The optical amplitude of the light beam outputted to the optical waveguide 7 at the end port is about 57% of that of the optical amplitude of the laser beam irradiated from the semiconductor laser 1.

Returning to FIG. 3, in the case where the input signal A is 1 and the input signal B is 1, a control signal 1 (an OFF level) is inputted into all of the first modulator 3, the second modulator 4, and the third modulator 5. In the above, the difference between the phase difference caused between the input port and the output port of the first waveguide 8 and that caused between the input port and the output port of the second waveguide 9 is 71°. Also, the difference between the phase difference caused between the input port and the output port of the third waveguide 10 and that caused between the input port and the output port of the second waveguide 9 is 91°.

Figure 7:
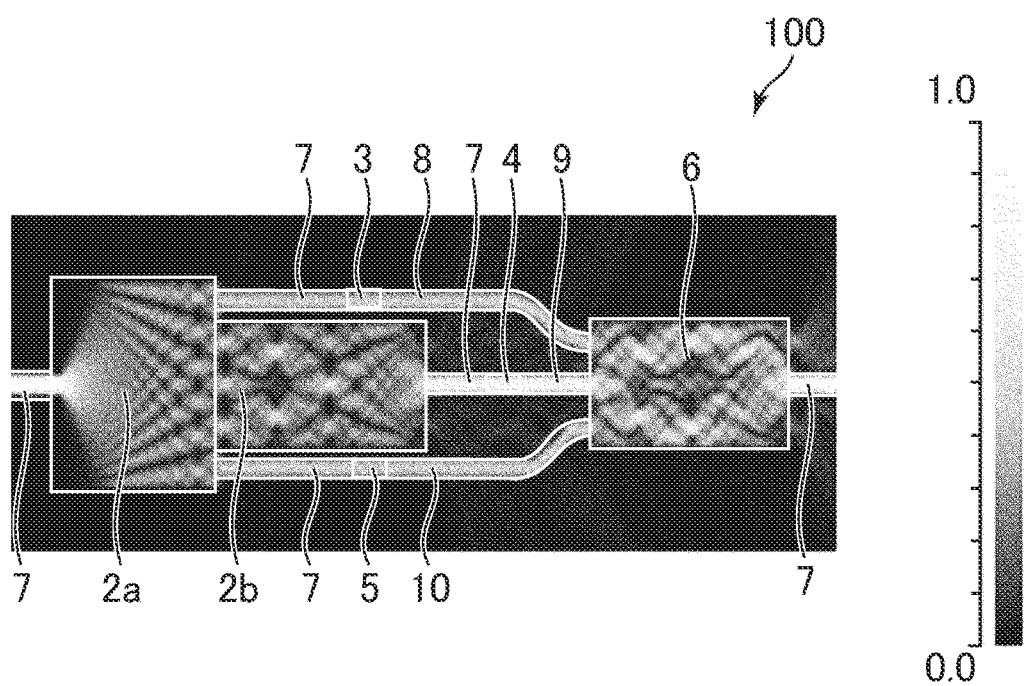
FIG. 7 shows an optical amplitude of a light beam propagated inside an optical transmitter module in the case of control signals with a fourth combination.

FIG. 7 shows an optical amplitude of a light beam propagated inside the optical transmitter module 100 in the case of control signals with a fourth combination (1, 1, 1). In this drawing, an optical amplitude distribution is expressed such that assuming that the optical amplitude of a laser beam irradiated from the semiconductor laser 1 is 1, white is expressed, and that assuming that the optical amplitude closer to 0, darker black is expressed. In this drawing, a light beam among the five branched light beams branched by the one-to-five demultiplexer portion 2a, inputted into the upper optical waveguide 7 is mostly let to pass through by the first modulator 3 to which a control signal at an ON level has been inputted. Three light beams among the five branched light beams branched by the one-to-five demultiplexer portion 2a, inputted into the three-to-one multiplexer portion 2b are inputted into the middle optical waveguide 7, and mostly let to pass through by the second modulator 4 to which a control signal at an ON level has been inputted. A light beam among the five branched light beams branched by the one-to-five demultiplexer portion 2a, inputted into the lower optical waveguide 7 is mostly let to pass through by the third modulator 5 to which a control signal at an ON level has been inputted.

Each of the first modulator 3, the second modulator 4, and the third modulator 5 let a majority of the branched light beam inputted thereinto to pass therethrough and absorb a hint thereof to output to the first waveguide 8, the second waveguide 9, and the third waveguide 10, respectively. To each of the light beams propagated inside the first waveguide 8, the second waveguide 9, and the third waveguide 10, a phase difference in accordance with the length and shape of the respective waveguide is caused. The three output light beams are inputted into the three-to-one multiplexer 6 with different phases, and multiplexed into one light beam before being outputted to the optical waveguide 7 at the end port. The optical amplitude of the light beam outputted to the optical waveguide 7 at the end port is about 82% of that of the optical amplitude of the laser beam irradiated from the semiconductor laser 1.

Figure 8:
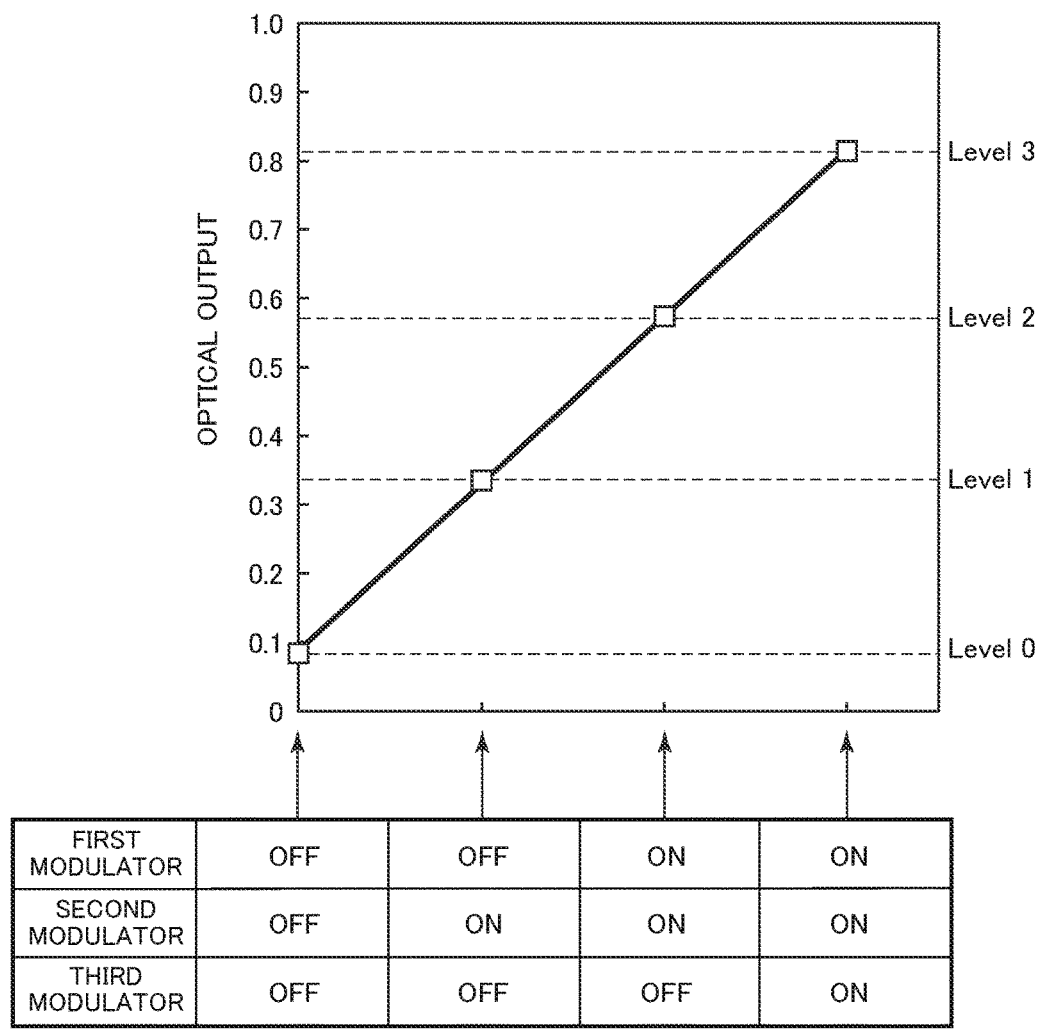
FIG. 8 shows a relationship between control signals to optical modulators and an optical output of an optical transmitter modulator as to an optical transmitter module according to the first embodiment of the present invention.

FIG. 8 shows a relationship between control signals to be inputted into the first modulator 3, the second modulator 4, and the third modulator 5, and an optical output of the optical transmitter module 100 as to the optical transmitter module 100 according to the first embodiment of the present invention. In the graph shown in this drawing, the ordinate indicates the ratio of an optical output of the optical transmitter module 100 to an optical output of the semiconductor laser 1, and the abscissa indicates four combinations for control signals. According to the optical transmitter module 100 according to this embodiment, for control signals with the first combination (0, 0, 0), an optical output of about 8% is resulted; for control signals with the second combination (0, 1, 0), an optical output of about 34% is resulted; for control signals with the third combination (1, 1, 0), an optical output of about 57% is resulted; and for control signals with the fourth combination (1, 1, 1), an optical output of about 82% is resulted. Assuming levels 0, 1, 2, and 3 in ascending order of optical output, the difference in optical output between the levels 3 and 2 is 25%; that between the levels 2 and 1 is 23%; and that between the levels 1 and 0 is 26%. The four optical output levels obtained are at substantially equal intervals within ±3%.

In the graph shown in this drawing, four optical output levels are plotted, and an approximate straight line calculated using a least-square method is shown. The correlation coefficient of the approximate straight line is $R^2=0.9998$, presenting superior linearity. Additionally, deviation in optical amplitude among the levels 0 to 3 when inputting a control signal to the first modulator 3, the second modulator 4, and the third modulator 5, respectively, based on the input signals A, B at 25 Gbit/s is within ±4% in an operating state. An error rate measured when transmitting the PAM 4 signal in a single mode optical fiber for 10 km is less than $10^{-5}$. That is, a preferable low error rate can be obtained.

As described above, according to the optical transmitter module 100 according to this embodiment, by inputting a control signal at two input levels to each of a plurality of optical modulators, it is possible to obtain a PAM 4 signal based on optical outputs at levels at substantially equal intervals. With the above, even when the relationship between an applied voltage and an optical output of an optical modulator is non-linear, voltage control can be achieved by merely applying a voltage at either an OFF level or an ON level. That is, control of a voltage to be applied to an optical modulator can be simplified. Furthermore, as a result of simplification of control of a voltage to be applied to an optical modulator, an expensive digital signal processor and a digital/analog converter adapted to high speed operation are not necessary to be mounted, and it is possible to obtain an optical transmitter module that can be manufactured at a low cost.

By making the optical transmitter modules 100 according to this embodiment with respect to eight different wavelengths and multiplexing, an optical transmitter module for 400 GbE can be obtained. Note that although the optical transmitter module 100 according to this embodiment is formed on an InP substrate, the optical transmitter module 100 may be formed on an SOI substrate by using a Si photonics technique. Alternatively, the optical transmitter module 100 may be formed as a waveguide type optical circuit formed on a quartz substrate. In this case, the semiconductor laser 1 is connected in a hybrid manner.

[Second Embodiment]

Figure 9:
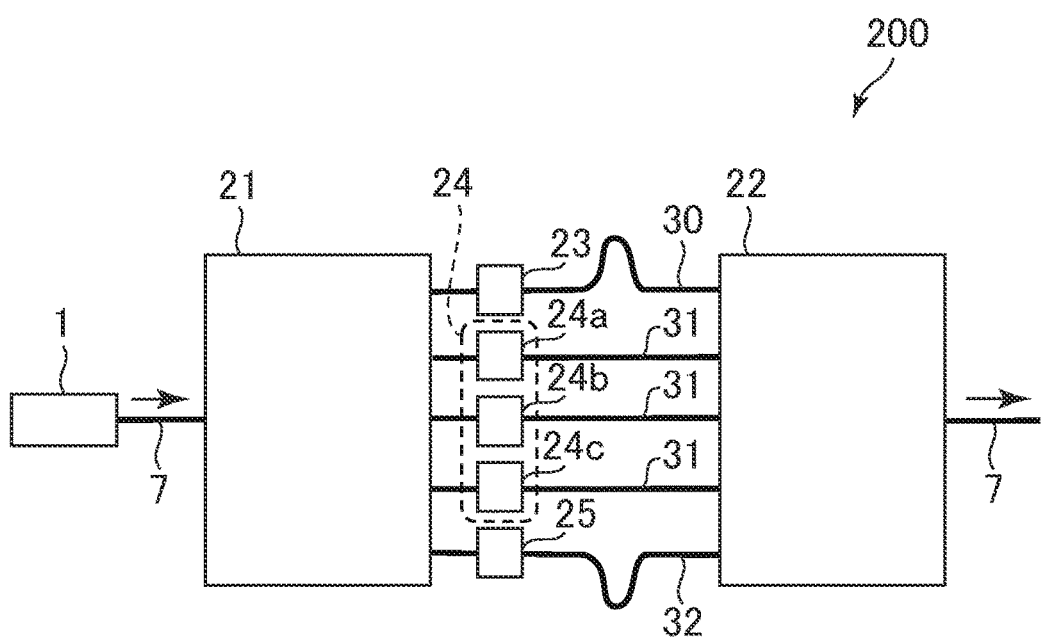
FIG. 9 shows a structure of an optical transmitter module according to a second embodiment of the present invention.

FIG. 9 shows a structure of an optical transmitter module 200 according to a second embodiment of the present invention. Similarly to the optical transmitter module 100 according to the first embodiment, the optical transmitter module 200 according to this embodiment outputs a light beam having an optical amplitude at four levels in response to three control signals. The optical transmitter module 200 according to this embodiment is different from the optical transmitter module 100 according to the first embodiment in which the optical transmitter module 200 includes a one-to-five demultiplexer 21, a five-to-one multiplexer 22, and five optical modulators.

The optical transmitter module 200 according to this embodiment includes the semiconductor laser 1 for irradiating a laser beam and the one-to-five demultiplexer 21 for branching a laser beam to output five branched light beams. The one-to-five demultiplexer 21 is a rectangular multimode interferometer, and substantially equally divides the optical output of a laser beam into five. The optical transmitter module 200 includes a first modulator 23, a second modulator 24a, a third modulator 24b, a fourth modulator 24c, and a fifth modulator 25 for modulating the optical amplitude of five respective branched light beams into a first optical amplitude or a second optical amplitude stronger than the first optical amplitude, depending on an input level at two levels. Note here that the second modulator 24a, the third modulator 24b, and the fourth modulator 24c together constitute a first modulator group 24, and receive the same control signal. The optical transmitter module 200 has the five-to-one multiplexer 22 for multiplexing optical outputs from the first modulator 23, the second modulator 24a, the third modulator 24b, the fourth modulator 24c, and the fifth modulator 25, respectively. The five-to-one multiplexer 22 is a rectangular multimode interferometer.

The optical transmitter module 200 includes a first waveguide 30 for connecting the first modulator 23 and the five-to-one multiplexer 22, three second waveguides 31 for connecting the second modulator 24a, the third modulator 24b, and the fourth modulator 24c with the five-to-one multiplexer 22, respectively, and a third waveguide 32 for connecting the fifth modulator 25 and the five-to-one multiplexer 22. Each of the first waveguide 30, the second waveguides 31, and the third waveguide 32 includes a first optical waveguide for causing a first phase difference between an input port thereof and an output port thereof and a second optical waveguide for causing a second phase difference different from the first phase difference between an input port thereof and an output port thereof. Specifically, each of the first waveguide 30 and the third waveguides 32 causes a phase difference different from that caused in the second waveguide 31 as the first waveguide 30 and the third waveguides 32 are longer than the second waveguide 31.

The optical transmitter module 200 according to this embodiment outputs a control signal to each of the first modulator 23, the first modulator group 24 (the second modulator 24a, the third modulator 24b, and the fourth modulator 24c), and the fifth modulator 25, and obtains an optical output at four levels. Specifically, in the case of control signals with a first combination (0, 0, 0) (in the case of inputting a control signal at an OFF level to all modulators), the optical amplitude of a light beam outputted to the optical waveguide 7 at the end port is about 9% of that of the laser beam irradiated from the semiconductor laser 1. Meanwhile, in the case of control signals with a second combination (0, 1, 0) (in the case of inputting a control signal at an OFF level to the first modulator 23 and the fifth modulator 25 and a control signal at an ON level to the second modulator 24a, the third modulator 24b, and the fourth modulator 24c), the optical amplitude of the light beam outputted to the optical waveguide 7 at the end port is about 34% of that of the laser beam irradiated from the semiconductor laser 1. Furthermore, in the case of control signals with a third combination (1, 1, 0) (in the case of inputting a control signal at an ON level to the first modulator 23, the second modulator 24a, the third modulator 24b, and the fourth modulator 24c and a control signal at an OFF level to the fifth modulator 25), the optical amplitude of the light beam outputted to the optical waveguide 7 at the end port is about 57% of that of the laser beam irradiated from the semiconductor laser 1. Yet further, in the case of control signals with a fourth combination (1, 1, 1) (in the case of inputting a control signal at an ON level to all optical modules), the optical amplitude of the light beam outputted to the optical waveguide 7 at the end port is about 83% of that of the laser beam irradiated from the semiconductor laser 1. Assuming levels 0, 1, 2, and 3 in ascending order of optical output, the difference in optical output between the levels 3 and 2 is 26%, that between the levels 2 and 1 is 24%, and that between the levels 1 and 0 is 25%. The four optical output levels obtained are at substantially equal intervals within ±3%.

When four optical output levels of the optical transmitter module 200 according to this embodiment are plotted and an approximate straight line is calculated according to a least-square method, the correlation coefficient of the approximate straight line is $R^2=0.9996$, presenting superior linearity. Further, deviation in optical amplitude among the levels 0 to 3 when inputting a control signal into the first modulator 23, the first modulator group 24, and the fifth modulator 25, based on the input signals A, B at 25 Gbit/s is within ±6% in an operating state. An error rate measured when transmitting the PAM 4 signal in a signal mode optical fiber for 2 km is less than $10^{-5}$. That is, a preferable low error rate can be obtained.

As described above, according to the optical transmitter module 200 according to this embodiment, it is possible to obtain a PAM 4 signal based on optical outputs at levels at substantially equal intervals by inputting a control signal at two input levels into a plurality of respective optical modulators. With the above, even when the relationship between an applied voltage and an optical output of an optical modulator is non-linear, voltage control can be achieved by merely applying a voltage at either an OFF level or an ON level. That is, control of a voltage to be applied to an optical modulator can be simplified. Furthermore, as a result of simplification of control of a voltage to be applied to an optical modulator, an expensive digital signal processor and a digital/analog converter adapted to high speed operation are not necessary to be mounted, and it is possible to obtain an optical transmitter module that can be manufactured at a low cost. Furthermore, it is possible to simplify the shape of a demultiplexer, compared to the optical transmitter module 100 according to the first embodiment.

By making the optical transmitter modules 200 according to this embodiment with respect to eight different wavelengths and multiplexing, an optical transmitter module for 400 GbE can be obtained. Note that although the optical transmitter module 200 according to this embodiment is formed on an InP substrate, similar to the optical transmitter module 100 according to the first embodiment, the optical transmitter module 200 may be formed on an SOI substrate by using Si photonics technique. Alternatively, the optical transmitter module 200 may be formed as a waveguide type optical circuit formed on a quartz substrate.

[Third Embodiment]

Figure 10:
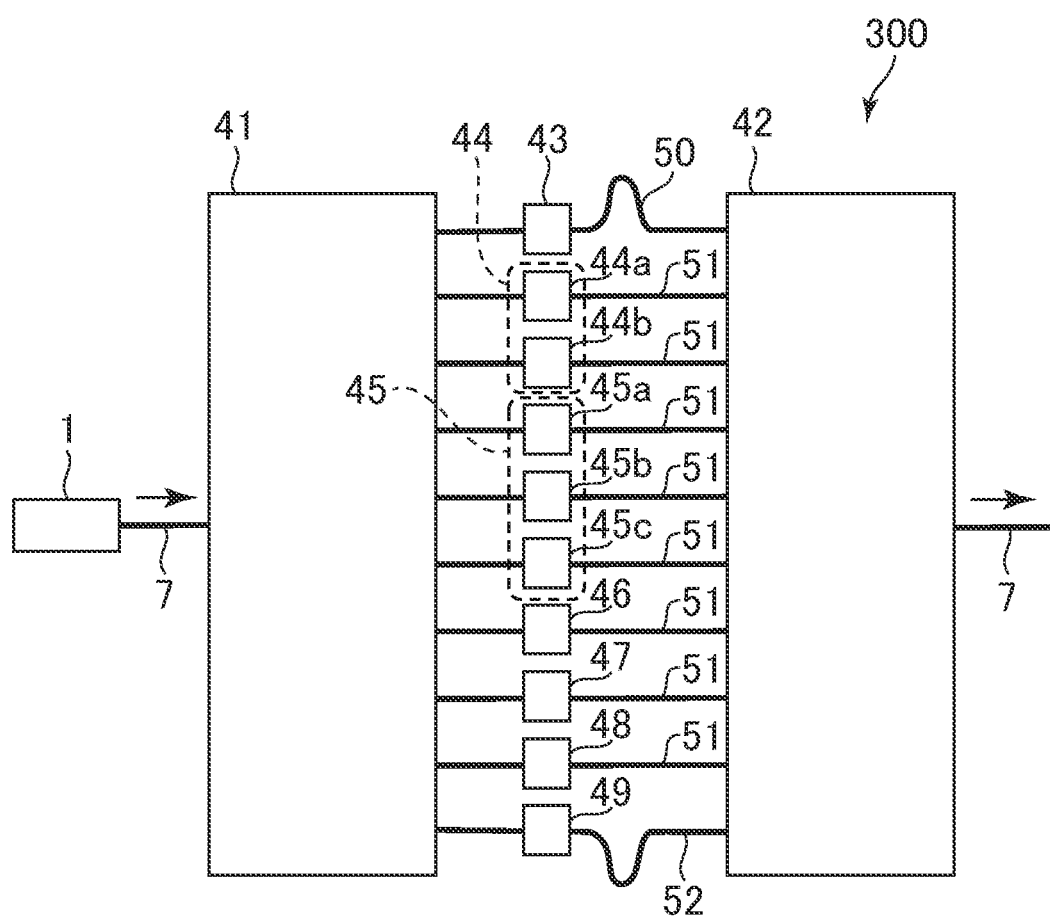
FIG. 10 shows a structure of an optical transmitter module according to a third embodiment of the present invention.

FIG. 10 shows a structure of an optical transmitter module 300 according to a third embodiment of the present invention. Differently from the optical transmitter module 100 according to the first embodiment, the optical transmitter module 300 according to this embodiment outputs a light beam having an optical amplitude at eight levels in response to seven control signals. The optical transmitter module 300 according to this embodiment is different from the optical transmitter module 100 according to the first embodiment in which the optical transmitter module 300 includes a one-to-ten demultiplexer 41, a ten-to-one multiplexer 42, and ten optical modulators.

The optical transmitter module 300 according to this embodiment includes the semiconductor laser 1 for irradiating a laser beam, and the one-to-ten demultiplexer 41 for branching a laser beam to output ten branched light beams. The one-to-ten demultiplexer 41 is a rectangular multimode interferometer, and substantially equally divides the optical output of a laser beam into ten. The optical transmitter module 300 includes a first modulator 43, a second modulator 44a, a third modulator 44b, a fourth modulator 45a, a fifth modulator 45b, a sixth modulator 45c, a seventh modulator 46, an eighth modulator 47, a ninth modulator 48, a tenth modulator 49 for modulating the optical amplitude of ten branched light beams into a first optical amplitude or a second optical amplitude stronger than the first optical amplitude, depending on an input level at two levels. Note here that the second modulator 44a and the third modulator 44b constitute a first modulator group 44, and each receive the same control signal. Furthermore, the fourth modulator 45a, the fifth modulator 45b, and the sixth modulator 45c constitute a second modulator group 45, and each receive the same control signal. The optical transmitter module 300 has the ten-to-one multiplexer 42 for multiplexing the light beams from the first modulator 43, the second modulator 44a, the third modulator 44b, the fourth modulator 45a, the fifth modulator 45b, the sixth modulator 45c, the seventh modulator 46, the eighth modulator 47, the ninth modulator 48, and the tenth modulator 49, respectively. The ten-to-one multiplexer 42 is a rectangular multimode interferometer.

The optical transmitter module 300 includes a first waveguide 50 for connecting the first modulator 43 and the ten-to-one multiplexer 42, eight second waveguides 51 for connecting the second modulator 44a, the third modulator 44b, the fourth modulator 45a, the fifth modulator 45b, the sixth modulator 45c, the seventh modulator 46, the eighth modulator 47, and the ninth modulator 48 with the ten-to-one multiplexer 42, respectively, and a third waveguide 52 for connecting the tenth modulator 49 and the ten-to-one multiplexer 42. Note here that the first waveguide 50, the second waveguides 51, and the third waveguide 52 include a first optical waveguide for causing a first phase difference between an input port thereof and an output port thereof and a second optical waveguide for causing a second phase difference different from the first phase difference between an input port thereof and an output port thereof. Specifically, each of the first waveguide 50 and the third waveguide 52 causes a phase difference different from that caused in the second waveguides 51 as the first waveguide 50 and the third waveguide 52 are longer than the second waveguide 51.

Figure 11:
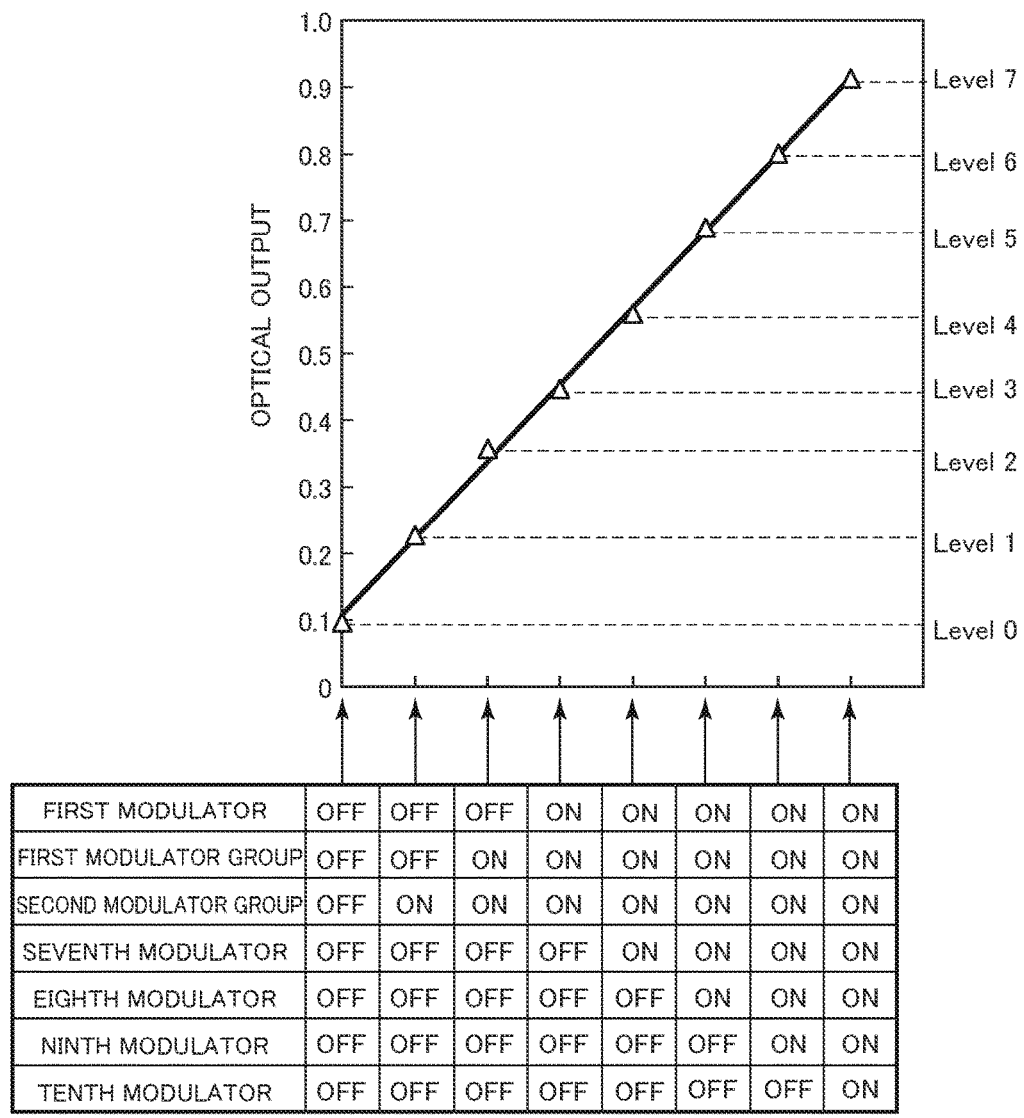
FIG. 11 shows a relationship between control signals to optical modulators and an optical output of an optical transmitter modulator as to an optical transmitter module according to the third embodiment of the present invention.

FIG. 11 shows a relationship between control signals to optical modulators and an optical output of an optical transmitter module as to the optical transmitter module 300 according to the third embodiment of the present invention. In the graph shown in this drawing, the ordinate indicates an optical output of the optical transmitter module 300 in the form of a ratio to an optical output of the semiconductor laser 1, and the abscissa indicates eight combinations for control signals. The optical transmitter module 300 according to this embodiment inputs control signals to the first modulator 43, the first modulator group 44 (the second modulator 44a and the third modulator 44b), the second modulator group 45 (the fourth modulator 45a, the fifth modulator 45b, and the sixth modulator 45c), the seventh modulator 46, the eighth modulator 47, the ninth modulator 48, and the tenth modulator 49, respectively, to obtain an optical output at eight levels. Specifically, in the case of control signals with a first combination (0, 0, 0, 0, 0, 0, 0) (in the case of inputting a control signal at an OFF level to all modulators), the optical amplitude of a light beam outputted to the optical waveguide 7 at an end port is about 9% of that of the laser beam irradiated from the semiconductor laser 1. In the case of control signals with a second combination (0, 0, 1, 0, 0, 0, 0) (in the case of inputting a control signal at an ON level only to the second modulator group 45, and a control signal at an OFF level to the other modulators), the optical amplitude of the light beam outputted to the optical waveguide 7 at an end port is about 22% of that of the laser beam irradiated from the semiconductor laser 1. In the case of control signals with a third combination (0, 1, 1, 0, 0, 0, 0) (in the case of inputting a control signal at an ON level to the first modulator group 44 and the second modulator group 45 and a control signal at an OFF level to the other modulators), the optical amplitude of the light beam outputted to the optical waveguide 7 at an end port is about 37% of that of the laser beam irradiated from the semiconductor laser 1. In the case of control signals with a fourth combination (1, 1, 1, 0, 0, 0, 0) (in the case of inputting a control signal at an ON level to the first modulator 43, the first modulator group 44, and the second modulator group 45, and a control signal at an OFF level to the other modulators), the optical amplitude of the light beam outputted to the optical waveguide 7 at an end port is about 45% of that of the laser beam irradiated from the semiconductor laser 1. In the case of control signals with a fifth combination (1, 1, 1, 1, 0, 0, 0) (in the case of inputting a control signal at an ON level to the first modulator 43, the first modulator group 44, the second modulator group 45, and the seventh modulator 46, and a control signal at an OFF level to the other modulators), the optical amplitude of the light beam outputted to the optical waveguide 7 at an end port is about 57% of that of the laser beam irradiated from the semiconductor laser 1. In the case of control signals with a sixth combination (1, 1, 1, 1, 1, 0, 0) (in the case of inputting a control signal at an ON level to the first modulator 43, the first modulator group 44, the second modulator group 45, the seventh modulator 46, and the eighth modulator 47, and a control signal at an OFF level to the other modulators), the optical amplitude of the light beam outputted to the optical waveguide 7 at an end port is about 69% of that of the laser beam irradiated from the semiconductor laser 1. In the case of control signals with a seventh combination (1, 1, 1, 1, 1, 1, 0) (in the case of inputting a control signal at an ON level to the first modulator 43, the first modulator group 44, the second modulator group 45, the seventh modulator 46, the eighth modulator 47, and the ninth modulator 48, and a control signal at an OFF level to the tenth modulator 49), the optical amplitude of the light beam outputted to the optical waveguide 7 at an end port is about 82% of that of the laser beam irradiated from the semiconductor laser 1. In the case of control signals with an eighth combination (1, 1, 1, 1, 1, 1, 1) (in the case of inputting a control signal at an ON level to all modulators), the optical amplitude of the light beam outputted to the optical waveguide 7 at an end port is about 93% of that of the laser beam irradiated from the semiconductor laser 1. Assuming levels 0, 1, 2, 3, 4, 5, 6, and 7 in ascending order of optical output, the difference in optical output between the levels 7 and 6 is 11%, that between the levels 6 and 5 is 13%, that between the levels 5 and 4 is 12%, that between the levels 4 and 3 is 12%, that between the levels 3 and 2 is 8%, that between the levels 2 and 1 is 15%, and that between the levels 1 and 0 is 13%. The eight optical output levels obtained are at substantially equal intervals within ±5%.

In the graph shown in the drawing, eight optical output levels of the optical transmitter module 300 according to this embodiment are plotted and an approximate straight line calculated using a least-square method is shown. The correlation coefficient of the approximate straight line is $R^2=0.9988$, presenting superior linearity. Additionally, deviation in optical amplitude among the levels 0 to 7 l when inputting a control signal to the first modulator 43, the first modulator group 44, the second modulator group 45, the seventh modulator 46, the eighth modulator 47, the ninth modulator 48, and the tenth modulator 49, respectively, based on four input signals at 25 Gbit/s is within ±12% in an operating state. An error rate measured when transmitting the PAM 8 signal in a single mode optical fiber for 2 km is less than $10^{-4}$. That is, a preferable low error rate can be obtained.

As described above, according to the optical transmitter module 300 according to this embodiment, by inputting a control signal at two input levels to each of a plurality of optical modulators, it is possible to obtain a PAM 8 signal based on optical outputs at levels at substantially equal intervals. With the above, even when the relationship between an applied voltage and an optical output of an optical modulator is non-linear, voltage control can be achieved by merely applying a voltage at either an OFF level or an ON level. That is, control of a voltage to be applied to an optical modulator can be simplified. Furthermore, as a result of simplification of control of a voltage to be applied to an optical modulator, expensive digital signal processor and digital/analog converter adapted to high speed operation are not necessary to be mounted, and it is possible to obtain an optical transmitter module that can be manufactured at a low cost. Furthermore, it is possible to simplify the shape of a demultiplexer, compared to the optical transmitter module 100 according to the first embodiment, and also to generate a larger multi-level PAM signal.

Note that although the optical transmitter module 300 according to this embodiment is formed on an InP substrate, similar to the optical transmitter module 100 according to the first embodiment, the optical transmitter module 300 may be formed on an SOI substrate by using Si photonics technique. Alternatively, the optical transmitter module 300 may be formed as a waveguide type optical circuit formed on a quartz substrate.

An embodiment of the present invention is not limited to the above described. The demultiplexer of the optical transmitter module may be formed including a first multimode interferometer for branching a laser beam of a semiconductor laser to output an N number of branched light beams (N being an integer equal to or greater than three) and a second multimode interferometer for multiplexing an M number of branched light beams (M being an integer equal to or greater than two, wherein M<N) among the N number of branched light beams into one light beam. For example, the one-to-three demultiplexer 2 of the optical transmitter module 100 according to the first embodiment corresponds to the case of N=5 and M=3. In the above, the optical transmitter module has an N−M+1 number of optical modulators, to each of which a control signal at two input levels is inputted. With this structure, control of a voltage to be applied to the optical modulator is simplified, and it is possible to generate a desired multi-level PAM signal without employing an expensive digital signal processor or digital/analog converter adapted to high speed operation. Accordingly, an optical transmitter module that can be manufactured at a low cost can be obtained.

Also, the multiplexer of the optical transmitter module may be formed using a third multimode interferometer for multiplexing the N−M+1 number of output light beams into a single light beam. For example, the three-to-one multiplexer 6 of the optical transmitter module 100 according to the first embodiment corresponds to the case of N=5 and M=3. The output light beams from the N−M+1 number of optical modulators may be connected via the N−M+1 number of optical waveguides to the third multimode interferometer. The N−M+1 number of optical waveguides may include a first optical waveguide for causing a first phase difference between the input port thereof and the output port thereof and a second optical waveguide for causing a second phase difference different from the first phase difference between the input port thereof and the output port thereof. With this structure, control of a voltage to be applied to the optical modulator is simplified, and it is possible to generate a desired multi-level PAM signal without employing an expensive digital signal processor or digital/analog converter adapted to high speed operation. Accordingly, an optical transmitter module that can be manufactured at a low cost can be obtained.

Also, the demultiplexer of the optical transmitter module may be formed using a fourth multimode interferometer for branching a laser beam of a semiconductor laser to output a K number of branched light beams (K being an integer equal to or greater than three). For example, the one-to-five demultiplexer 21 of the optical transmitter module 200 according to the second embodiment corresponds to the case of K=5, and the one-to-ten demultiplexer 41 of the optical transmitter module 300 according to the third embodiment corresponds to the case of K=10. In the above, the optical transmitter module has the K number of optical modulators, to each of which a control signal at two input levels is inputted. With this structure, control of a voltage to be applied to the optical modulator is simplified, which makes it possible to generate a desired multi-level PAM signal without employing an expensive digital signal processor or digital/analog converter adapted to high speed operation. Accordingly, it is possible to obtain an optical transmitter module manufactured at a low cost.

Also, the multiplexer of the optical transmitter module may be formed using a fifth multimode interferometer for multiplexing the K number of output light beams into a single light beam. For example, the five-to-one multiplexer 22 of the optical transmitter module 200 according to the second embodiment corresponds to the case of K=5, and the ten-to-one multiplexer 42 of the optical transmitter module 300 according to the third embodiment corresponds to the case of K=10. The output light beams from the K number of optical modulators may be connected to the fifth multimode interferometer via the K number of optical waveguides. The K number of optical waveguides may include a first optical waveguide for causing a first phase difference between the input port thereof and the output port thereof and a second optical waveguide for causing a second phase difference different form the first phase difference between the input port thereof and the output port thereof. With this structure, control of a voltage to be applied to the optical modulator is simplified, and it is possible to generate a desired multi-level PAM signal without employing an expensive digital signal processor or digital/analog converter adapted to high speed operation. Accordingly, an optical transmitter module that can be manufactured at a low cost can be obtained.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical transmitter module, comprising:
   a semiconductor laser for irradiating a laser beam;
   a demultiplexer for branching the laser beam to output a plurality of branched light beams;
     a plurality of optical modulators for modulating an optical amplitude of each of the plurality of branched light beams into a first optical amplitude or a second optical amplitude stronger than the first optical amplitude, depending on an input level at two levels; and
     a multiplexer for multiplexing output light beams from the plurality of optical modulators,
   wherein:
     the demultiplexer is a multimode interferometer, and
     the demultiplexer includes a first multimode interferometer for branching the laser beam to output an N number (N being an integer equal to or greater than three) of branched light beams, and a second multimode interferometer for multiplexing an M number (M being an integer equal to or greater than two, wherein M<N) of branched light beams among the N number of branched light beams.

2. The optical transmitter module according to claim 1, further comprising:
   a plurality of optical waveguides for connecting the plurality of optical modulators and the multiplexer,
   wherein the plurality of optical waveguides include:
     a first optical waveguide for causing a first phase difference between an input port thereof and an output port thereof, and
     a second optical waveguide for causing a second phase difference different from the first phase difference between an input port thereof and an output port thereof.

3. The optical transmitter module according to claim 1, wherein the multiplexer includes a third multimode interferometer for multiplexing an N−M+1 number of output light beams into a single light beam.

\* \* \* \* \*